US008868688B2

(12) United States Patent
Milford

(10) Patent No.: US 8,868,688 B2
(45) Date of Patent: Oct. 21, 2014

(54) OUTPUTTING CONTENT FROM MULTIPLE DEVICES

(75) Inventor: Peter Milford, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 427 days.

(21) Appl. No.: 13/144,629

(22) PCT Filed: Jul. 20, 2010

(86) PCT No.: PCT/US2010/042566
§ 371 (c)(1),
(2), (4) Date: Sep. 28, 2011

(87) PCT Pub. No.: WO2012/011894
PCT Pub. Date: Jan. 26, 2012

(65) Prior Publication Data
US 2012/0023186 A1 Jan. 26, 2012

(51) Int. Cl.
*G06F 15/16* (2006.01)
*G06F 17/30* (2006.01)

(52) U.S. Cl.
CPC .. *G06F 17/30876* (2013.01); *G06F 2213/0038* (2013.01)
USPC .......................................... 709/219; 709/212

(58) Field of Classification Search
CPC .................... G06F 17/30861; G06F 17/30876; G06F 2213/0038
USPC ........... 725/110; 455/466; 709/231, 205–206, 709/219, 212; 358/1.16; 700/94
See application file for complete search history.

(56) References Cited

U.S. PATENT DOCUMENTS

| 8,112,548 B2 | 2/2012 | Cui et al. |
| 2003/0167174 A1 | 9/2003 | Dagtas et al. |
| 2004/0098601 A1 | 5/2004 | Epstein |
| 2004/0260682 A1 | 12/2004 | Herley et al. |
| 2005/0171938 A1 | 8/2005 | Fisher et al. |
| 2007/0223037 A1* | 9/2007 | Sasaki et al. ................. 358/1.16 |
| 2008/0161948 A1 | 7/2008 | Bodin et al. |

(Continued)

FOREIGN PATENT DOCUMENTS

| JP | 2007-149103 | 6/2007 |
| JP | 2008-288694 | 11/2008 |

(Continued)

OTHER PUBLICATIONS www.wireless.att.com/learn/musicid.jsp; retrieved Mar. 2, 2010.

(Continued)

*Primary Examiner* — Jungwon Chang
(74) *Attorney, Agent, or Firm* — Moritt Hock & Hamroff LLP; Steven S. Rubin, Esq.

(57) ABSTRACT

Technologies are generally described for outputting content from multiple devices. In some examples, a method includes receiving content from a first content output device at a processor. In some examples, the method further includes recording at least a portion of the content by the processor. In some examples, the method further includes determining an identifier of the content by the processor based on the portion. In some examples, the method further includes determining a source of the content by the processor based on the identifier. In some examples, the method further includes requesting that the content be sent from the source to a second content output device.

19 Claims, 5 Drawing Sheets

(56) References Cited

U.S. PATENT DOCUMENTS

| | | | |
|---|---|---|---|
| 2009/0094331 A1* | 4/2009 | Nobori et al. | 709/205 |
| 2010/0093393 A1 | 4/2010 | Graef | |
| 2010/0185306 A1* | 7/2010 | Rhoads | 700/94 |
| 2010/0263009 A1* | 10/2010 | Meuninck et al. | 725/110 |
| 2011/0153856 A1* | 6/2011 | Piepenbrink et al. | 709/231 |
| 2011/0252100 A1* | 10/2011 | Raciborski et al. | 709/206 |
| 2013/0165164 A1* | 6/2013 | Rowe | 455/466 |

FOREIGN PATENT DOCUMENTS

| | | |
|---|---|---|
| JP | 2009071624 | 2/2009 |
| JP | 2009534758 | 9/2009 |
| JP | 2009237738 | 10/2009 |
| JP | 2010154415 | 8/2010 |
| KR | 1020050086616 | 8/2005 |
| KR | 1020060127961 | 12/2006 |
| KR | 1020080009951 | 1/2008 |
| KR | 100865443 | 10/2010 |
| WO | 2007124347 | 11/2007 |

OTHER PUBLICATIONS

PCT International Search Report PCT/ISA/210 for PCT/US2010/42566 dated May 9, 2011.

PCT Written Opinion of the International Searching Authority PCT/ISA/237 for PCT/US2010/42566 dated May 9, 2011.

http://www.mfm.nickcircosta.com, retrieved Jul. 13, 2011.

http://www.consumer.philips.com/c/wireless - multi - room - music/33388/cat/gb/, retrieved Jul. 14, 2011.

http://philip.greenspun.com/materialism/whole - house - music, retrieved Apr. 30, 2011.

http://www.gracenote.com/; retrieved Jul. 13, 2011.

(na.blackberry.com/eng/services/media/mediasync.jsp); retrieved Jul. 13, 2011.

Odayoth et al., English Translation of Abstract for KR patent publication 1020080009951, dated Jan. 30, 2008, 2 pages.

* cited by examiner

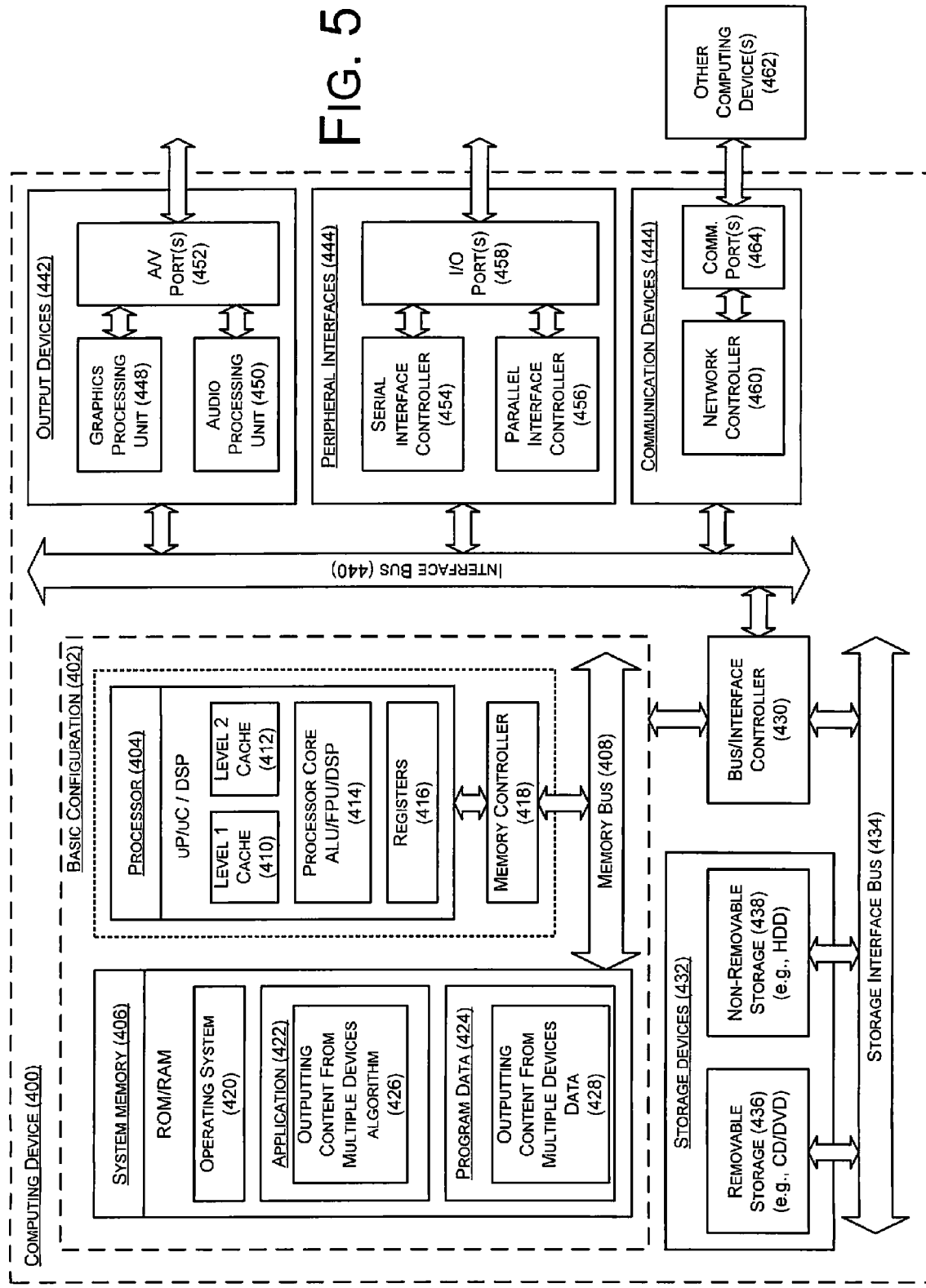

OUTPUTTING CONTENT FROM MULTIPLE DEVICES

CROSS REFERENCE TO RELATED APPLICATIONS

This application is a 371 of International Application No. PCT/US2010/042566 filed Jul. 20, 2010, the entirety of which is hereby incorporated by reference.

BACKGROUND

Unless otherwise indicated herein, the materials described in this section are not prior art to the claims in this application and are not admitted to be prior art by inclusion in this section.

Content, such as audio or video information, electronic books, Internet publications, etc. may be output by different content output devices. For example, content may be output to a user through an audio player, speaker, radio, computer, cell phone, augmented reality device, etc. In general, these types of content output devices create waves that are discernable by a human. The content may be available from more than one source.

SUMMARY

In one example, a method is described for outputting content from a content output device. In some examples, the method includes receiving content from a first content output device at a processor. In some examples, the method includes recording at least a portion of the content by the processor. In some examples, the method includes determining an identifier of the content by the processor based on the portion. In some examples, the method includes determining a source of the content by the processor based on the identifier. In some examples, the method includes requesting that the content be sent from the source to a second content output device.

In one example, a device effective to output content from a content output device is described. In some examples, the device includes a memory. In some examples, the device includes a processor in communication with the memory. In some examples the processor is effective to receive content from a first content output device. In some examples the processor is effective to record at least a portion of the content in the memory. In some examples the processor is effective to determine an identifier of the content based on the portion. In some examples the processor is effective to determine a source of the content based on the identifier. In some examples the processor is effective to request that the content be sent from the source to a second content output device.

In one example, a system effective to output content from a content output device is described. In some examples, the system includes a memory. In some examples, the system includes a first processor in communication with the memory. In some examples, the system includes a second processor in communication with the first processor. In some examples the first processor is effective to receive content from a first content output device. In some examples the first processor is effective to record at least a portion of the content in the memory. In some examples the first processor is effective to send the portion over a network to the second processor. In some examples the second processor is effective to receive the portion. In some examples the second processor is effective to determine an identifier of the content based on the portion. In some examples the second processor is effective to determine a source of the content based on the identifier. In some examples the second processor is effective to request that the content be sent from the source to a second content output device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a block diagram illustrating an example computing device that is arranged to output content from multiple devices;

Figure 1:
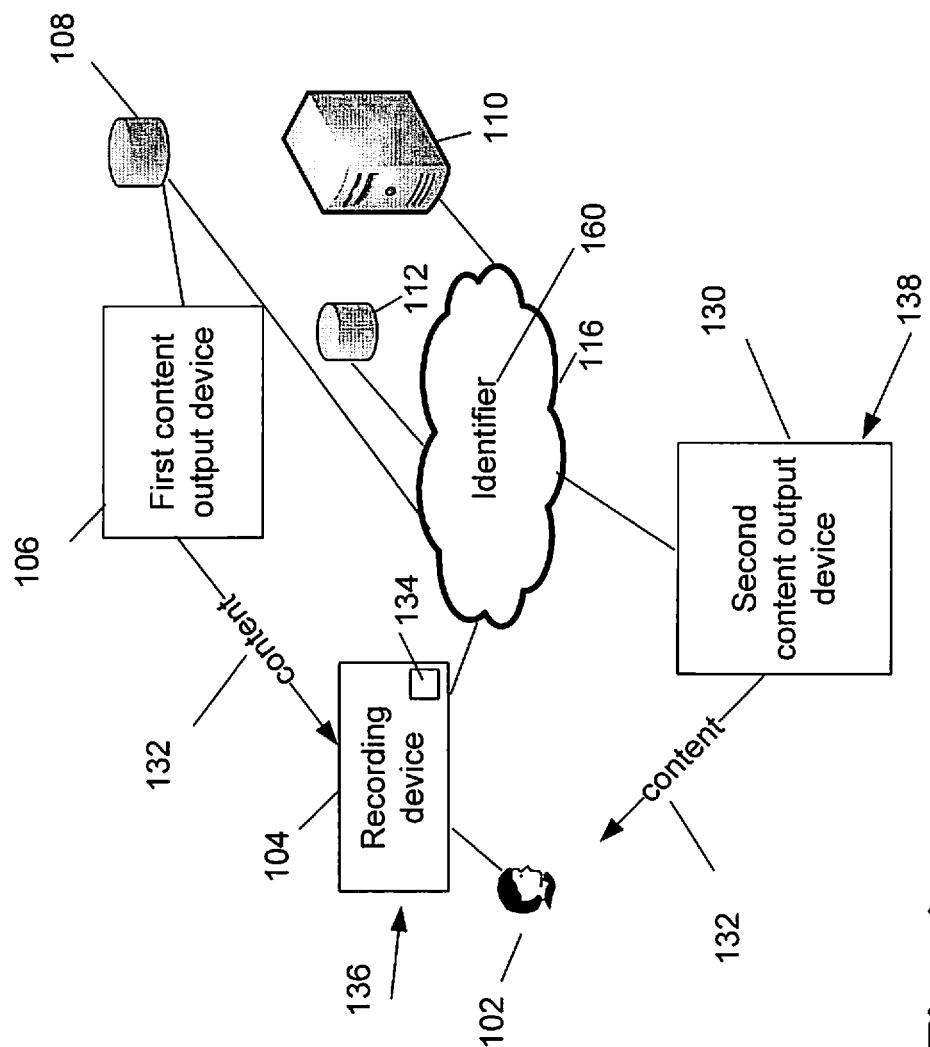
FIG. 1 illustrates some example systems that can be utilized to output content from multiple devices.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to outputting content from multiple devices.

Briefly stated, technologies are generally described for outputting content from multiple devices. In some examples, a method includes receiving content from a first content output device at a processor. In some examples, the method further includes recording at least a portion of the content by the processor. In some examples, the method further includes determining an identifier of the content by the processor based on the portion. In some examples, the method further includes determining a source of the content by the processor based on the identifier. In some examples, the method further includes requesting that the content be sent from the source to a second content output device.

FIG. 1 illustrates some example systems that can be utilized to output content from multiple devices in accordance with at least some embodiments described herein. As discussed in more detail below, in some examples, a system 100 may include a first content output device 106 in communication with a memory 108 and a recording device 104. In these examples, system 100 further includes a memory 112 and a second content output device 130 in communication with a processor 110 over a network 116. Processor 110 may be in communication with recording device 104 over network 116.

In some examples, network 116 may be the Internet network. In some examples, network 116 may be a local area network and/or a wide area network.

In some examples, recording device 104 may receive content 132 output by first content output device 106. A location of content 132 may be in memory 108. In some examples, recording device 104 may be configured to record a portion 134 of content 132. In some examples, recording device 104 may be configured to record portion 134 of content 132 by buffering portion 134 in a memory and then sending portion 134 to another device. In these examples content 132 may be streamed through recording device 104. In some examples, recording device 104 may be configured to analyze portion of content 134. In some examples, recording device 104 may be configured to send portion of content 134 to processor 110 over network 116 and processor 110 may be configured to analyze portion of content 134. Based on the analysis by either recording device 104 and/or processor 110, recording device 104 and/or processor 110 may be configured to determine an identifier 160 for content 132. In some examples, recording device 104 and/or processor 110 may be configured to determine a source for content 132 that may be used by second content output device 130, based on identifier 160. For example, recording device 104 and/or processor 110 may be configured to search for identifier 160 over network 116. In some examples, recording device 104 and/or processor 110 may be configured to determine a source for content 132 in response to a request by a user 102. In some examples, recording device 104 and/or processor 110 may be configured to determine a source for content 132 in response to a determination by recording device 104 and/or processor 110 that content 132 has terminated being output by first content output device 106. For example, recording device 104 and/or processor 110 may be configured to recognize an identifier or a change in identifiers indicating that content 132 has terminated being output by first content output device 106.

In some examples, a source for content 132 that may be used by second content output device 130 may be memory 108 used by first content output device 106. In some examples, a source for content 132 that may be used by second content output device 130 may be another memory 112 accessible over network 116. Recording device 104 and/or processor 110 may be configured to request that content 132 be sent from memory 108 or memory 112 to second content output device 130. In some examples, recording device 104 may be at a first location 136 and second content output device 130 may be at a second location 138 different from first location 136.

Figure 2:
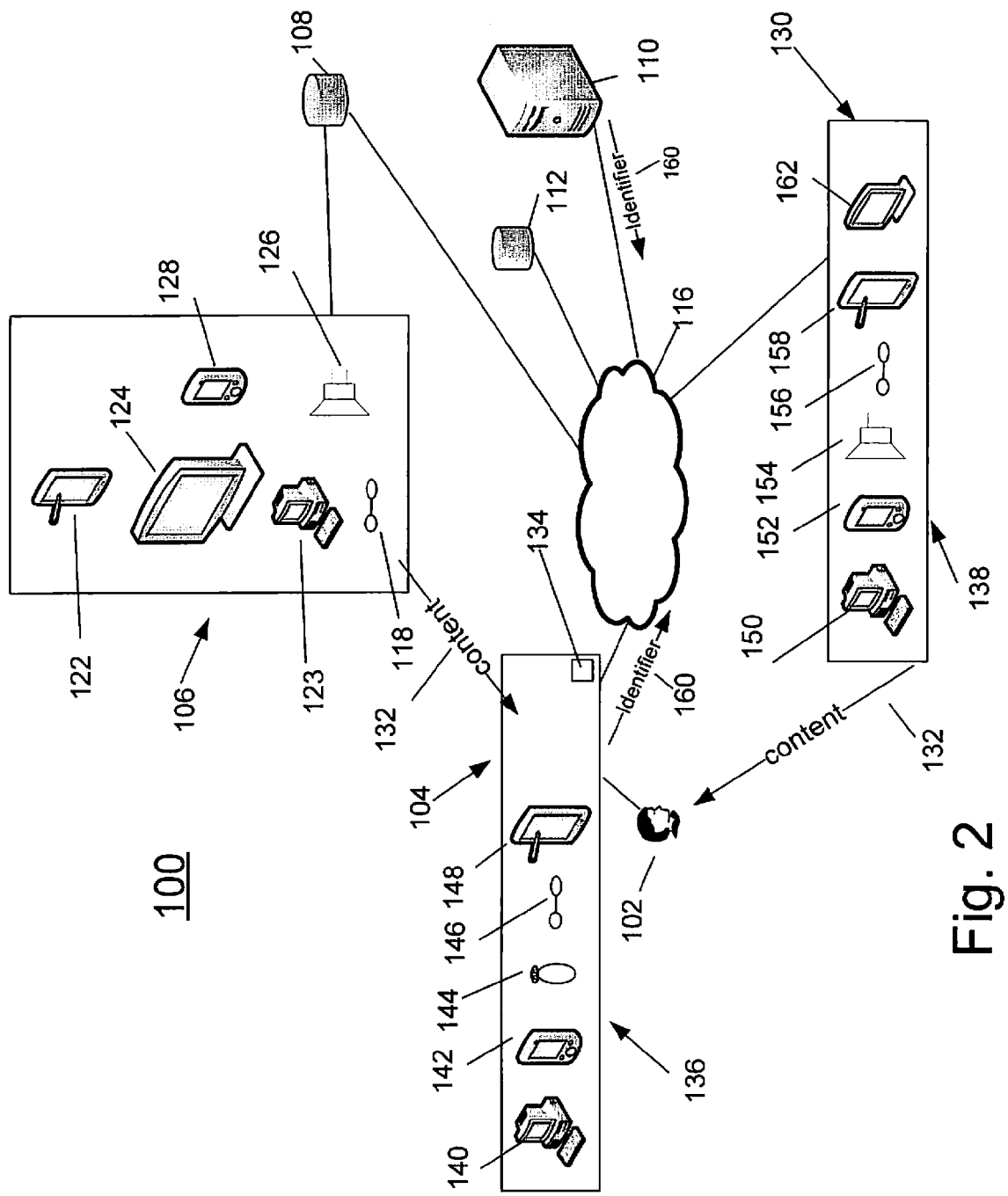
FIG. 2 illustrates some example systems that can be utilized to output content from multiple devices.

FIG. 2 illustrates some example systems that can be utilized to output content from multiple devices in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity.

In addition to the components described above in FIG. 1, in some examples, first content output device 106 could be a computer 123, a tablet computer 122, a monitor or television 124, a cell phone 128, a speaker 126, and/or a computer generated reality device 118, etc. In some examples, content recording device 104 could be a computer 140, a cell phone 142, a device with a microphone 144, a computer generated reality device 146, and/or a tablet computer 148, etc. Similarly, in some examples, second content output device 130 could be a computer 150, a cell phone 152, a speaker 154, a computer generated reality device 156, a tablet computer 158 and/or a monitor or television 162, etc. In some examples, computer 140 and 150 are in the same housing. In some examples, cell phone 142 and 152 are in the same housing. In some examples, computer generated reality devices 146 and 156 are in the same housing. In some examples, tablet computers 148 and 158 are in the same housing. In some examples, device with a microphone 144 may include a music player including a microphone, a wearable computer including a microphone, a Bluetooth enabled headset, etc.

In some examples, user 102 may send an indication to recording device 104 and/or processor 110 indicating which second content output device 130 that user 102 desires to output content 132. For example, recording device 104 and/or processor 110 may be configured to store an identifier of second content output device 130 indicated by user 102.

In an example, user 102 and recording device 104 may receive content 132 from speaker 126 in the form of music output by a radio. A source of content 132 may be in memory 108 at the radio station. In the example, recording device 104 may be a smart phone 142 such as an APPLE IPHONE with an application adapted to record portion of content 134. In an example, portion of content 134 may be ten seconds of content 132. In an example, smart phone 142 may be configured to determine identifier 160 of the song/content 132 including a current location in the song/content 132. For example, identifier 160 may indicate that content 132 is song ABC and that a current location is 2 minutes from a start of song/content 132. In another example, recording device 104 may be configured to send portion of content 134 over network 116 to processor 110 and processor 110 may be configured to determine identifier 160 of song/content 132. In some examples, recording device 104 and/or processor 110 may be configured to send portion of content 134 to a third party service such as GRACENOTE.COM to determine identifier 160. In some examples, recording device 104 and/or processor 110 may be configured to continuously determine identifier 160 while content 132 is output by first content output device 106. In some examples, recording device 104 and/or processor 110 may be configured to periodically determine identifier 160.

In some examples, after identifier 160 is determined, recording device 104 and/or processor 110 may be configured to determine a source of content 132. For example, recording device 104 and/or processor 110 may be configured to search for identifier 160 over network 116. In some examples, a source of content 132 may be memory 108 used by first content output device 106. In other examples, a source of content 132 may be another memory 112. After a source of content 132 is determined, recording device 104 and/or processor 110 may be configured to request that content 132 be sent to second content output device 130.

Continuing with the example, user 102 may start receiving song/content 132 from a speaker 126 of a radio in a car. A smart phone 142 may be configured to record portion of content 134. After user 102 turns off the radio, either smart phone 142 or processor 110 may be configured to determine identifier 160 including a current location in song/content 132. In the example, smart phone 142 and/or processor 110 may be configured to use identifier 160 to find a source of content 132 and request that content 132 be sent to second content output device 130. For example, a source of content 132 may be a web site hosted by the radio station. In the example, recording device 104 and/or processor 110 may request that content 132 be sent to second content output device 130. Second content output device 130 may include smart phone 152 or a speaker in user's home theater system 154. As mentioned above, user 102 may send an indication to recording device 104 and/or processor 110 indicating which second content output device 130 should receive and output content 132.

In some examples, memory 112 may be accessible through a web site such as AMAZON, ITUNES, PANDORA, etc. In some examples, memory 112 may be a web site run by a radio station. Recording device 104 and/or processor 110 may be configured to request content 132 from such a web site based on identifier 160. In some examples, user 102 may have an account with such a web site and recording device 104 and/or processor 110 may be configured to send account data for user 102 to the web site.

In some examples, memory 112 may be owned by user 102 such as in a home music library. In some examples, memory 112 may be a digital library of music owned by user 102 such as may be accessible by a home network 116.

In some examples, content 132 may be sent from first content output device 106 and received by recording device 104 wirelessly such as in the radio communication example mentioned above. In some examples, content 132 may be sent from first content output device 106 and received by recording device 104 through a wired connection such as through an auxiliary output port on a radio. In some examples, content 132 may be sent from first content output device 106 and received by recording device 104 through a network such as the Internet or a Wi-Fi network.

In some examples, recording device 104 and/or processor 110 may be configured to determine identifier 160 based on data sent by first content output device 106. For example, a radio may send information in content 132 using the RDS (radio data system). Recording device 104 and/or processor 110 may be configured to use the information to determine identifier 160.

In some examples, recording device 104 and/or processor 110 may be configured to continuously request that content 132 be sent to second content output device 130 even while content 132 is being output by first content output device 106. In this way, content 132 may be buffered and ready to be output by second content output device 130.

In examples where content 132 is a movie or other audio and video content, recording device 104 and/or processor 110 may be configured to determine identifier 160 in any of a number of ways. For example, recording device 104 and/or processor 110 may be configured to determine identifier 160 by analyzing an audio stream of content 132, analyzing a video stream of content 132, analyzing a still image of content 132, analyzing a beacon from content output device 106, and/or analyzing meta data relating to content 132. Recording device 104 and/or processor 110 may be configured to send portion of content 134 to a third party service to determine identifier 160. Identifier 160 may include a name and a current location in the video. In an example, user 102 may start watching video/content 132 on tablet computer 148 and continue to watch video/content 132 on a larger television 162.

In examples where content 132 is a digital book, recording device 104 may be computer generated reality device 146 such as glasses. Device 146 may be configured to record portion of content 134 by recording a portion of a page from book/content 132. Recording device 104 and/or processor 110 may be configured to request that book/content 132 be sent from a source to second content output device 130. For example, book/content 132 may be available at a web site such as AMAZON or APPLE.

In examples where content 132 is a web page, recording device 104 may be computer generated reality device 146 such as glasses. Device 146 may be configured to record portion of content 134 by recording an address such as the URL (uniform resource locator) of page/content 132. Recording device 104 and/or processor 110 may be configured to request that page/content 132 be sent from a source to second output device 130.

Figure 3:
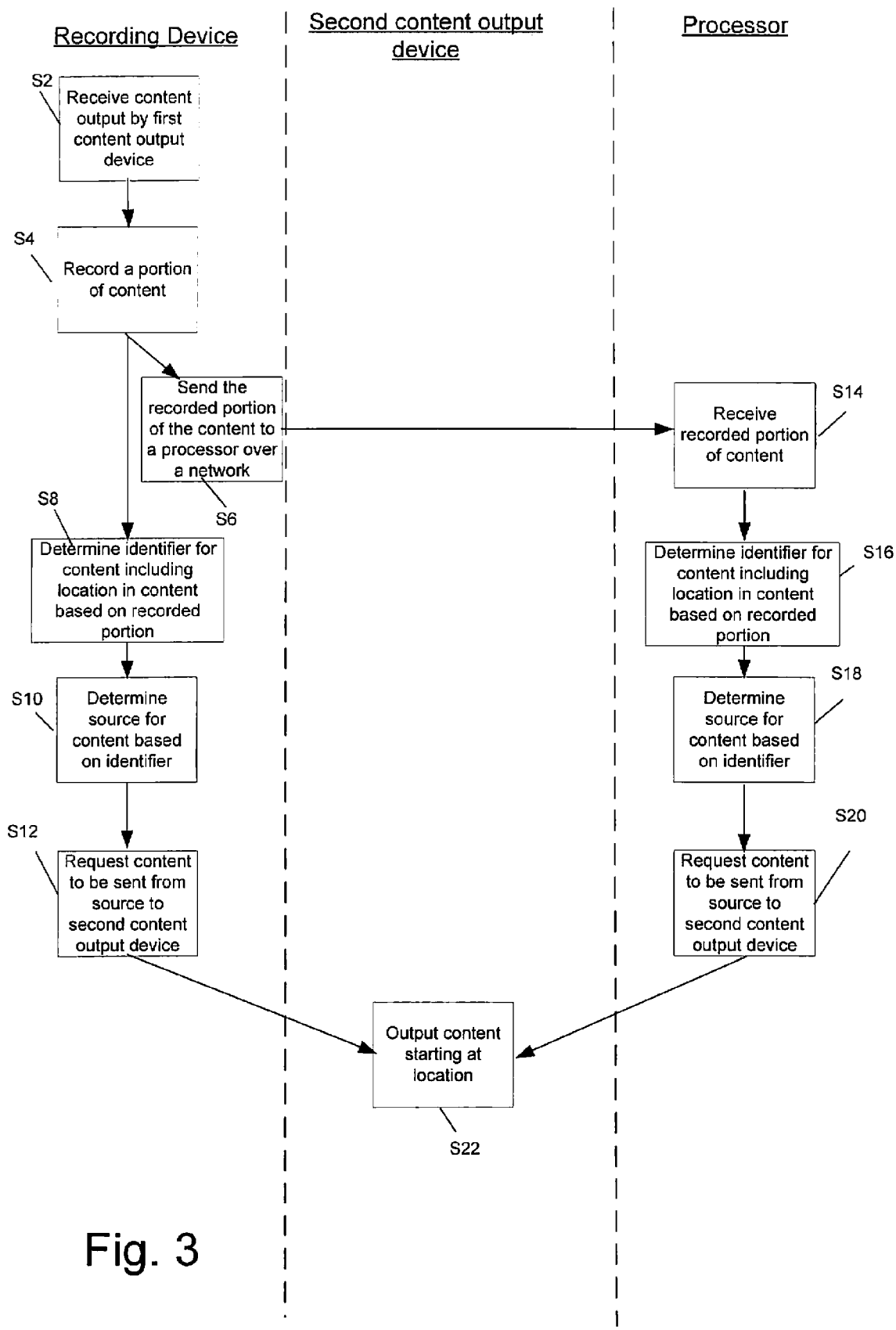
FIG. 3 depicts a flow diagram for example processes for outputting content from multiple devices.

FIG. 3 depicts a flow diagram for example processes for outputting content from multiple devices arranged in accordance with at least some embodiments described herein. The process in FIG. 3 could be implemented using, for example, system 100 discussed above. An example process may include one or more operations, actions, or functions as illustrated by one or more of blocks S2, S4, S6, S8, S10, S12, S14, S16, S18, S20, and/or S22. Although illustrated as discrete blocks, various blocks may be divided into additional blocks, combined into fewer blocks, or eliminated, depending on the desired implementation. Processing may begin at block S2.

At block S2, a recording device may be configured to receive content output by a first content output device. Processing may continue from block S2 to block S4.

At block S4, the recording device may be configured to record a portion of the content. Processing may continue from block S4 to either block S6 or block S8.

At block S6, the recording device may be configured to send the recorded portion of the content to a processor over a network. Processing may continue from block S6 to block S14.

At block S8, the recording device may be configured to determine an identifier for the content including a location in the content based on the recorded portion. Processing may continue from block S8 to block S10.

At block S10, the recording device may be configured to determine a source for the content based on the identifier. Processing may continue from block S10 to block S12.

At block S12, the recording device may be configured to request that the content be sent from the source to a second content output device. Processing may continue from block S12 to block S22. At block S22, the second content output device may be configured to output the content starting at the location.

At block S14, the processor may be configured to receive the recorded portion of the content. Processing may continue from block S14 to block S16.

At block S16, the processor may be configured to determine an identifier for the content including a location in the content based on the recorded portion. Processing may continue from block S16 to block S18.

At block S18, the processor may be configured to determine a source for the content based on the identifier. Processing may continue from block S18 to block S20.

At block S20, the processor may be configured to request that the content be sent from the source to a second content output device. Processing may continue from block S20 to block S22. At block S22, as mentioned above, the second content output device may be configured to output the content starting at the location.

Figure 4:
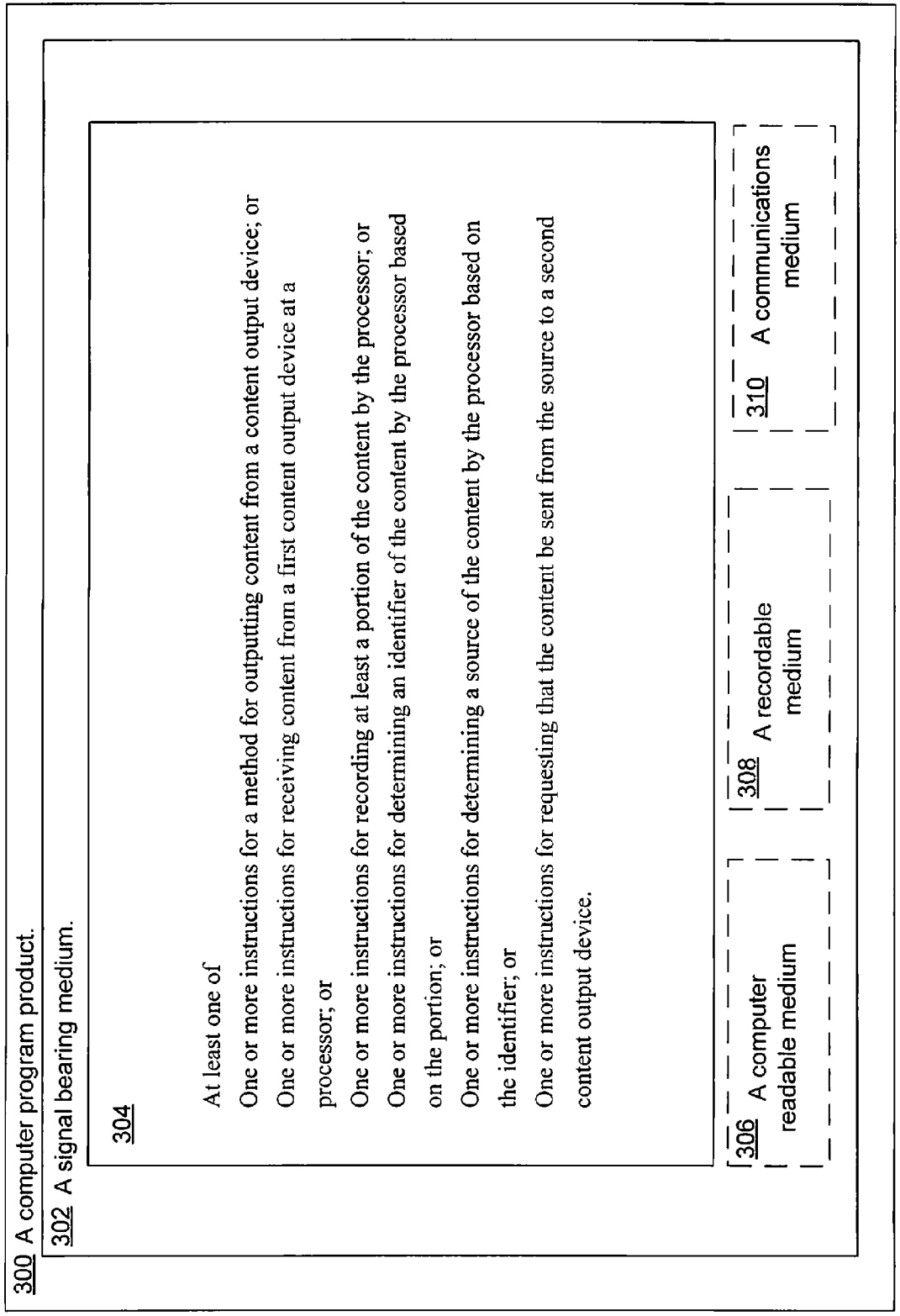
FIG. 4 illustrates computer program products for outputting content from multiple devices.

FIG. 4 illustrates computer program products 300 for outputting content from multiple devices arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, recording device 104 and/or processor 110 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 5 is a block diagram illustrating an example computing device 400 that is arranged to perform outputting content from multiple devices arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include an outputting content from multiple devices algorithm 426 that is arranged to perform the functions as described herein including those described previously with respect to FIGS. 1-4. Program data 424 may include outputting content from multiple devices data 428 that may be useful for an outputting of content from multiple devices algorithm as is described herein. In some embodiments, application 422 may be arranged to operate with program data 424 on operating system 420 such that outputting content from multiple devices may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for outputting content from a content output device, the method comprising, by a processor:
   receiving output content output from a speaker;
   recording at least a portion of the output content output from the speaker;
   analyzing the portion;
   determining an identifier of the output content based on the analysis of the portion, wherein the identifier is based on information in the output content;
   determining, by sending the identifier over a network, a source memory of the output content based on the identifier; and
   requesting that the content be sent from the source memory to the content output device, wherein the content output device is in a different housing than the speaker.

2. The method as recited in claim 1, wherein the processor includes at least one of a computer, a phone, a microphone, and a computer generated reality device.

3. The method as recited in claim 1, wherein:
   the processor is a first processor;
   determining the source memory of the content further comprises
      sending the portion from the first processor to a second processor over the network; and
      determining the identifier by the second processor based on the portion; and
   requesting that the content be sent includes requesting, by the second processor, that the content be sent from the source memory to the content output device.

4. The method as recited in claim 1, wherein:
   the content includes a song.

5. The method as recited in claim 1, wherein the identifier includes a location in the content.

6. The method as recited in claim 5, further comprising: outputting the content from the content output device starting at the location.

7. The method as recited in claim 1, wherein:
the processor is at a first location; and
the content output device is at a second location different from the first location.

8. The method as recited in claim 1, wherein the speaker is effective to output the content from the source memory.

9. The method as recited in claim 1, wherein:
the source memory is a first source memory; and
the speaker is effective to output the content from a second source memory different from the first source memory.

10. The method as recited in claim 1, wherein the source memory includes a music library in communication with the content output device over a local area network.

11. The method as recited in claim 1, wherein the source memory includes a web site.

12. The method as recited in claim 1, wherein the processor and the content output device are in the same housing.

13. The method as recited in claim 1, further comprising:
receiving, by the processor, an identification of the second content output device from a user.

14. A device effective to output content from a content output device, the device comprising:
a memory;
a processor in communication with the memory, the processor effective to
receive output content from a speaker;
record at least a portion of the output content in the memory;
analyze the portion;
determine an identifier of the output content based on the analysis of the portion,
wherein the identifier is based on information in the output content;
determine, by sending the identifier over a network, a source memory of the output content based on the identifier; and
request that the content be sent from the source memory to the content output device, wherein the content output device is in a different housing than the speaker.

15. The device as recited in claim 14, wherein:
the content includes a song; and
the identifier includes a location in the song.

16. The device as recited in claim 14, wherein:
the source memory is a first source memory; and
the speaker is effective to output the content from a second source memory different from the first source memory.

17. A system effective to output content from a content output device, the system comprising:
a memory;
a first processor in communication with the memory;
a second processor in communication with the first processor;
the first processor effective to
receive output content from a speaker;
record at least a portion of the output content in the memory; and
send the portion over a network to the second processor;
the second processor effective to
receive the portion;
analyze the portion;
determine an identifier of the output content based on the analysis of the portion,
wherein the identifier is based on information in the output content;
determine, by sending the identifier over a network, a source memory of the output content based on the identifier; and
request that the content be sent from the source memory to the content output device, wherein the content output device is in a different housing than the speaker.

18. The system as recited in claim 17, wherein the content output device is effective to receive and output the content.

19. The system as recited in claim 18, wherein the first processor and the content output device are in the same housing.

* * * * *

UNITED STATES PATENT AND TRADEMARK OFFICE
CERTIFICATE OF CORRECTION

| | |
|---|---|
| PATENT NO. | : 8,868,688 B2 |
| APPLICATION NO. | : 13/144629 |
| DATED | : October 21, 2014 |
| INVENTOR(S) | : Milford |

It is certified that error appears in the above-identified patent and that said Letters Patent is hereby corrected as shown below:

In The Claims

In Column 11, Lines 23-24, in Claim 13, delete "second content" and insert -- content --, therefor.

Signed and Sealed this
Fifth Day of May, 2015

Michelle K. Lee
*Director of the United States Patent and Trademark Office*